(12) United States Patent
Matsuda

(10) Patent No.: US 11,941,220 B2
(45) Date of Patent: Mar. 26, 2024

(54) INPUT DEVICE

(71) Applicant: Alps Alpine Co., Ltd., Tokyo (JP)

(72) Inventor: Atsushi Matsuda, Miyagi-ken (JP)

(73) Assignee: Alps Alpine Co., Ltd., Tokyo (JP)

( * ) Notice: Subject to any disclaimer, the term of this patent is extended or adjusted under 35 U.S.C. 154(b) by 8 days.

(21) Appl. No.: 17/858,687

(22) Filed: Jul. 6, 2022

(65) Prior Publication Data

US 2022/0334682 A1 Oct. 20, 2022

Related U.S. Application Data

(63) Continuation of application No. PCT/JP2020/046817, filed on Dec. 15, 2020.

(30) Foreign Application Priority Data

Jan. 20, 2020 (JP) .................. 2020-006898

(51) Int. Cl.
*G06F 3/041* (2006.01)
*G06F 3/044* (2006.01)

(52) U.S. Cl.
CPC .......... *G06F 3/0448* (2019.05); *G06F 3/0443* (2019.05); *G06F 3/0446* (2019.05); *G06F 2203/04101* (2013.01)

(58) Field of Classification Search
CPC .... G06F 3/0448; G06F 3/0443; G06F 3/0446; G06F 2203/04101; G06F 3/0418; G06F 2203/04103
USPC ......................................... 345/173, 156, 174
See application file for complete search history.

(56) References Cited

U.S. PATENT DOCUMENTS

| | | | |
|---|---|---|---|
| 2018/0059852 A1* | 3/2018 | Sterling | G06F 3/041662 |
| 2018/0059866 A1* | 3/2018 | Drake | G06F 3/0446 |
| 2020/0387279 A1* | 12/2020 | Kim | G06F 3/0412 |
| 2021/0089156 A1* | 3/2021 | Nakanishi | G06F 3/0446 |
| 2021/0208651 A1* | 7/2021 | Reynolds | G06F 3/0412 |
| 2021/0311581 A1* | 10/2021 | Ishizaki | G02F 1/13338 |

FOREIGN PATENT DOCUMENTS

JP 2015-132867 7/2015

OTHER PUBLICATIONS

International Search Report for International Application No. PCT/JP2020/046817 dated Mar. 16, 2021.

* cited by examiner

*Primary Examiner* — Thuy N Pardo
(74) *Attorney, Agent, or Firm* — Beyer Law Group LLP

(57) ABSTRACT

An input device includes: an operation surface that receives an operation from an operating body that is in close proximity thereto; and first detection electrodes that are arranged along the operation surface and that extend parallel to each other in a first direction. Each of the first detection electrodes has first detection surfaces that are provided side by side in the first direction and a first current path portion that extends linearly in the first direction and via which the first detection surfaces are connected to each other; and each of the first detection surfaces has one or more second current path portions and a pair of first connection portions via which the one or more second current path portions and the first current path portion are connected in parallel to each other.

11 Claims, 7 Drawing Sheets

INPUT DEVICE

CLAIM OF PRIORITY

This application is a Continuation of International Application No. PCT/JP2020/046817 filed on Dec. 15, 2020, which claims benefit of Japanese Patent Application No. 2020-006898 filed on Jan. 20, 2020. The entire contents of each application noted above are hereby incorporated by reference.

BACKGROUND OF THE INVENTION

1. Field of the Invention

The present invention relates to an input device.

2. Description of the Related Art

Heretofore, in an input device that performs proximity sensing on an operating body relative to an operation surface on the basis of electrostatic capacitance values of respective detection electrodes, a technology has been known in which with respect to each of a plurality of detection electrodes that are orthogonal to each other, a proximity position of an operating body at the detection electrode is detected on the basis of the ratio of an electrostatic capacitance value detected at a detection portion of one end side of the detection electrode versus an electrostatic capacitance value detected at a detection portion of another end side of the detection electrode (for example, see Japanese Unexamined Patent Application Publication No. 2015-132867).

In the known input device, however, when the length of each detection electrode is small, a sufficient current-path length cannot be obtained in each detection electrode, and thus the resistance value of each detection electrode cannot be increased sufficiently. In this case, in the known input device, even when the operating body is in close proximity to the operation surface, almost no change occurs in the electrostatic capacitance value at each detection electrode, and thus high-accuracy proximity sensing cannot be performed.

Thus, for example, when the current path in each detection electrode is small, the known input device cannot obtain a sufficient resistance value from each detection electrode and thus cannot perform high-accuracy proximity sensing. Also, for example, in the known input device, when a low-resistance, low-cost electrode film is used for each detection electrode, a sufficient resistance value cannot be obtained at each detection electrode, and proximity sensing cannot be performed with high accuracy.

SUMMARY OF THE INVENTION

An input device according to one embodiment includes: an operation surface that receives an operation from an operating body that is in close proximity thereto; and first detection electrodes that are arranged along the operation surface and that extend parallel to each other in a first direction. Each of the first detection electrodes has first detection surfaces that are provided side by side in the first direction and a first current path portion that extends linearly in the first direction and via which the first detection surfaces are connected to each other; and each of the first detection surfaces has one or more second current path portions and a pair of first connection portions via which the one or more second current path portions and the first current path portion are connected in parallel to each other.

According to one embodiment, in an input device that performs proximity sensing on an operating body relative to an operation surface on the basis of electrostatic capacitance values of detection electrodes, it is possible to easily adjust resistance values at the detection electrodes.

DESCRIPTION OF THE PREFERRED EMBODIMENTS

One embodiment will be described below with reference to the accompanying drawings.

<Configuration of Input Device 100>

Figure 1:
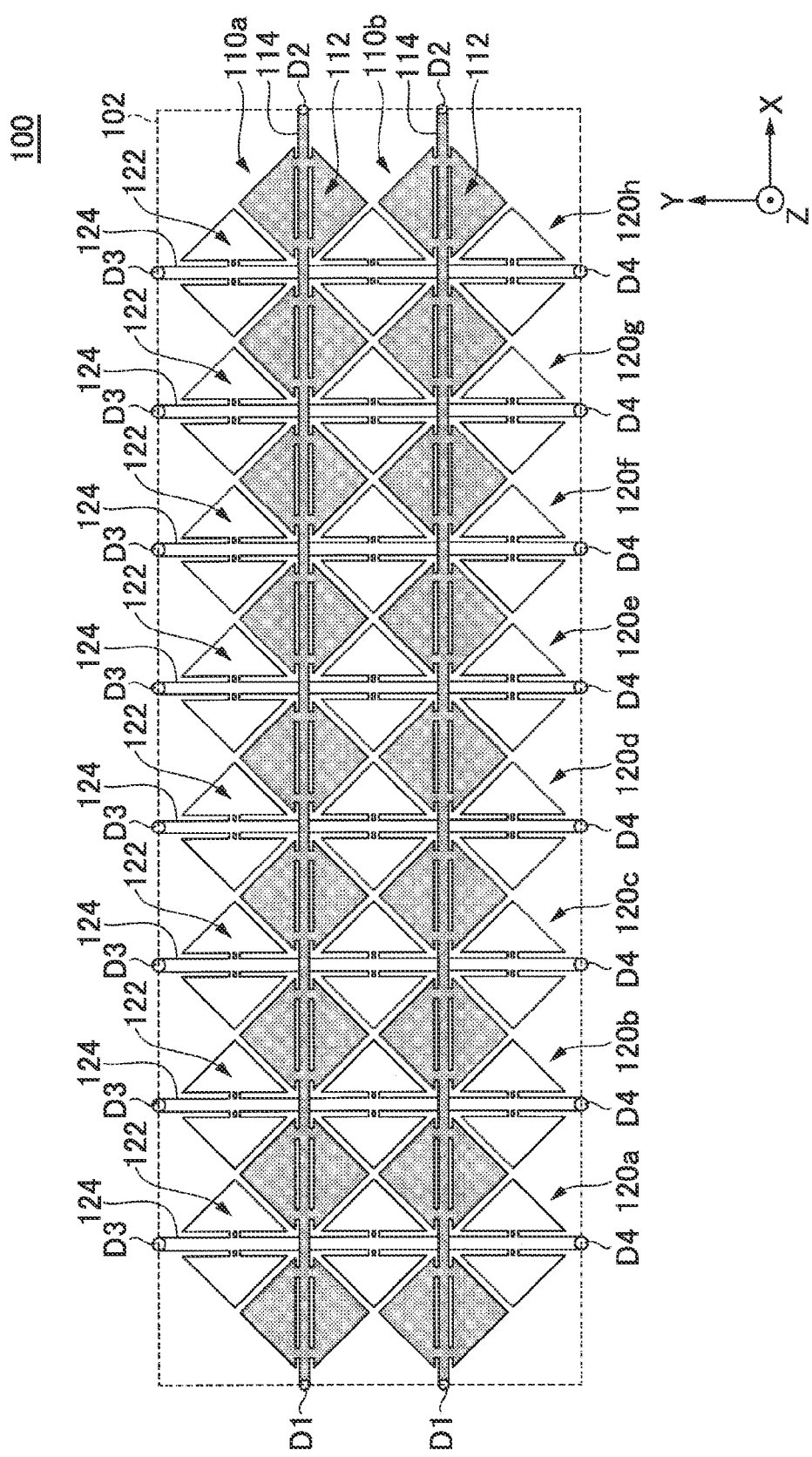
FIG. 1 is a view illustrating the configuration of an input device according to one embodiment.

FIG. 1 is a diagram illustrating the configuration of an input device 100 according to one embodiment. As illustrated in FIG. 1, the input device 100 is, for example, a touch panel or the like utilizing electrostatic capacitance detection based on a self-capacitance system. The input device 100 includes an operation surface 102, a plurality of first detection electrodes 110 (two first detection electrodes 110*a* and 110*b* in the example illustrated in FIG. 1), and a plurality of second detection electrodes 120 (eight second detection electrodes 120*a* to 120*h* in the example illustrated in FIG. 1). The example illustrated in FIG. 1, however, is one example, and the number of first detection electrodes 110 and the number of second detection electrodes 120 may each be any number.

In FIG. 1 and subsequent drawings, for the sake of convenience, the first detection electrodes 110 are hatched, and the second detection electrodes 120 are not hatched in order to facilitate distinction between the first detection electrodes 110 and the second detection electrodes 120.

The operation surface 102 is a horizontal surface (a flat surface parallel to an XY plane) having a laterally long rectangular shape in plan view from above (in a positive direction of a Z-axis). The operation surface 102 is a surface that receives an operation performed by an operating body (for example, a hand finger of an operator). The operation surface 102 is formed of, for example, a laminar member (such as a resin plate or a glass plate).

The first detection electrodes 110*a* and 110*b* are arranged along the operation surface 102. Each of the first detection electrodes 110a and 110b extends in a lateral direction (an X-axis direction, which is one example of a "first direction"). The first detection electrodes 110a and 110b are arranged parallel to each other with a predetermined spacing therebetween in a vertical direction (a Y-axis direction, which is one example of a "second direction"). Each of the first detection electrodes 110a and 110b is arranged orthogonal to each of the second detection electrodes 120a to 120h.

In each of the first detection electrodes 110a and 110b, a plurality of first detection surfaces 112 (nine first detection surfaces 112 in the example illustrated in FIG. 1) is linearly arranged in the lateral direction (the X-axis direction). In this example, although each of the first detection surfaces 112 has a rhombus shape, it does not necessarily have to have a rhombus shape and may have a polygonal shape other than a rhombus shape. The first detection surfaces 112 are coupled to each other via a first current path portion 114 that extends linearly in the lateral direction (the X-axis direction). In other words, each of the first detection electrodes 110a and 110b has the first detection surfaces 112 that are provided side by side in the X-axis direction (the first direction) and the first current path portion 114 that extends linearly in the X-axis direction (the first direction) and via which the first detection surfaces 112 are connected to each other.

That is, in the example illustrated in FIG. 1, in the input device 100, the first detection electrodes 110a and 110b have 18 rhombus first detection surfaces 112 arranged in a matrix with two rows×nine columns. Each of the first detection electrodes 110a and 110b has, at a left-end portion, a detection portion D1 for detecting an electrostatic capacitance value and has, at a right-end portion, a detection portion D2 for detecting an electrostatic capacitance value.

The second detection electrodes 120a to 120h are arranged along the operation surface 102. The second detection electrodes 120a to 120h extend parallel to each other in the second direction (the Y-axis direction) different from the first direction (the X-axis direction). That is, each of the second detection electrodes 120a to 120h extends in the vertical direction (the Y-axis direction). The second detection electrodes 120a to 120h are arranged parallel to each other with a predetermined spacing therebetween in the lateral direction (the X-axis direction). Also, each of the second detection electrodes 120a to 120h is arranged orthogonal to each of the first detection electrodes 110a and 110b.

Each of the second detection electrodes 120a to 120h has a plurality of second detection surfaces 122 (three second detection surfaces 122 in the example illustrated in FIG. 1) that are linearly arranged in the vertical direction (the Y-axis direction). In this example, although each of the second detection surfaces 122 has a rhombus shape, it does not necessarily have to have a rhombus shape and may have a polygonal shape other than a rhombus shape. The second detection surfaces 122 are coupled to each other via a third current path portion 124 that extends linearly in the vertical direction (the Y-axis direction). In other words, each of the second detection electrodes 120a to 120h has the second detection surfaces 122 that are provided side by side in the Y-axis direction (the second direction) and the third current path portion 124 that extends linearly in the Y-axis direction (the second direction) and via which the second detection surfaces 122 are connected to each other.

That is, in the example illustrated in FIG. 1, in the input device 100, the eight second detection electrodes 120a to 120h have 24 second detection surfaces 122 arranged in a matrix with three rows×eight columns. Each of the second detection electrodes 120a to 120h has, at an upper end portion, a detection portion D3 for detecting an electrostatic capacitance value and has, at a lower end portion, a detection portion D4 for detecting an electrostatic capacitance value.

Each of the second detection surfaces 122 included in the second detection electrodes 120a to 120h is arranged in a gap between the first detection surfaces 112 so as not to overlap the first detection surfaces 112 included in the first detection electrodes 110a and 110b.

At intersections of the first current path portions 114 in the first detection electrodes 110 and the third current path portions 124 in the second detection electrodes 120, the first current path portions 114 and the third current path portions 124 are insulated from each other so that the first current path portions 114 and the third current path portions 124 are not electrically continuous to each other.

Each of the first detection electrodes 110a and 110b and the second detection electrodes 120a to 120h are formed using a low-cost, electrically conductive, thin-film-shaped material.

<Configuration of Electrical Connections in Input Device 100>

Figure 2:
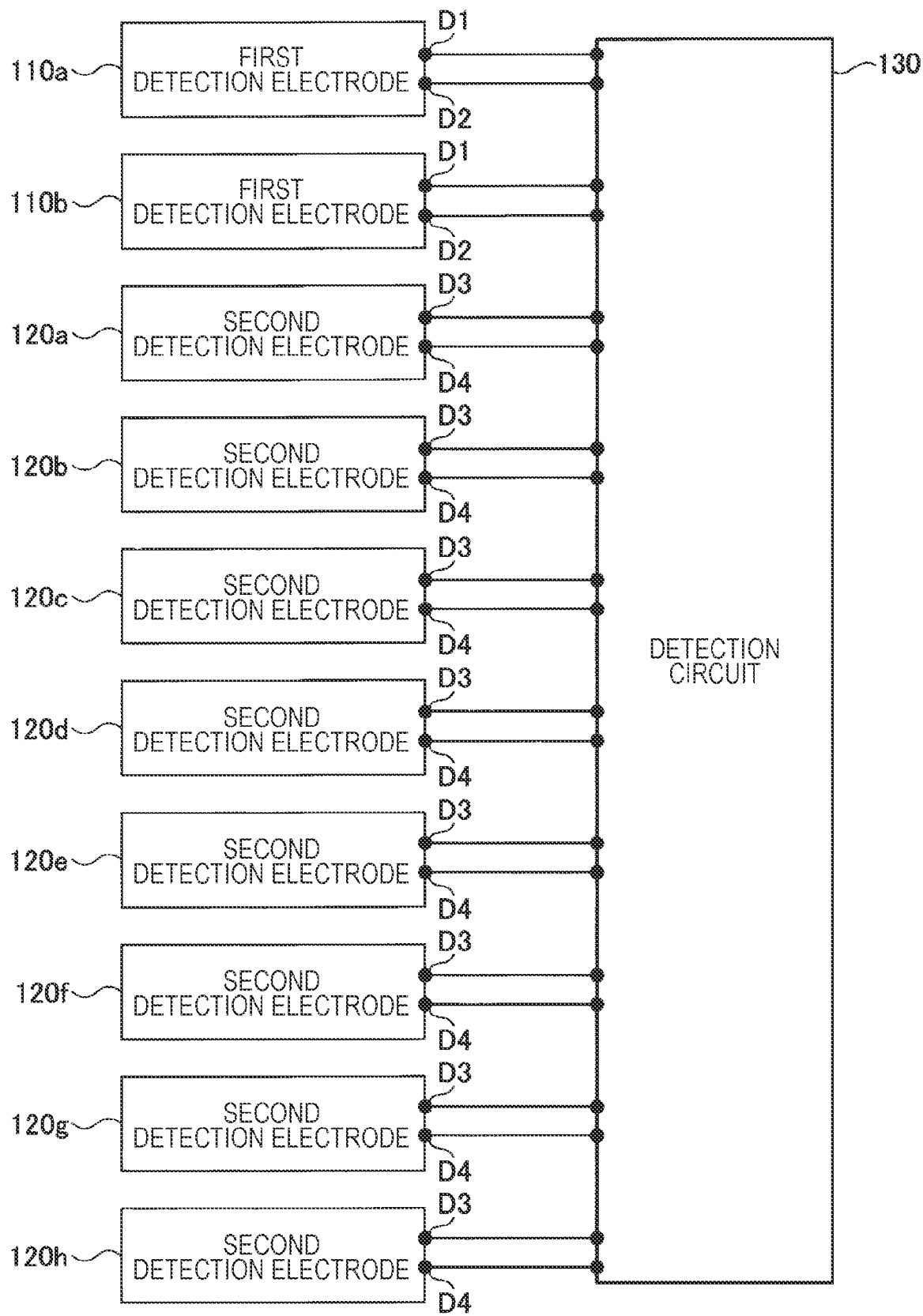
FIG. 2 is a diagram illustrating the configuration of electrical connections in the input device according to one embodiment.

FIG. 2 is a diagram showing the configuration of electrical connections in the input device 100 according to one embodiment. As illustrated in FIG. 2, the input device 100 includes a detection circuit 130 in addition to the first detection electrodes 110a and 110b and the second detection electrodes 120a to 120h described above with reference to FIG. 1.

The detection circuit 130 is connected to the detection portions D1 and D2 of each of the first detection electrodes 110a and 110b. The detection circuit 130 is also connected to the detection portions D3 and D4 of each of the second detection electrodes 120a to 120h.

In the input device 100, each of the electrostatic capacitance values of the first detection electrodes 110a and 110b and the second detection electrodes 120a to 120h varies according to a proximity state of the operating body relative to the operation surface 102.

The detection circuit 130 drives each of the first detection electrodes 110a and 110b by supplying an alternating-current voltage thereto. With respect to each of the first detection electrodes 110a and 110b, the detection circuit 130 can detect the electrostatic capacitance value at the detection portion D1 at the left-end portion and the electrostatic capacitance value at the detection portion D2 at the right-end portion. In addition, with respect to each of the first detection electrodes 110a and 110b, the detection circuit 130 can locate the proximity position of the operating body, based on the electrostatic capacitance value at the detection portion D1 and the electrostatic capacitance value at the detection portion D2. In such a surface-type detection system, since a detection value is determined based on the ratio of resistance values from the proximity position of the operating body to the detection portions D1 and D2, each of the first detection electrodes 110a and 110b needs to have a certain degree of resistance value.

For example, when the operating body is in close proximity to a center of the first detection electrode 110, the electrostatic capacitance value at the detection portion D1 and the electrostatic capacitance value at the detection portion D2 become substantially equal to each other.

Also, for example, when the operating body is in close proximity to a position more adjacent to the detection portion D1 than to the center of the first detection electrode 110, the electrostatic capacitance value at the detection portion D1 becomes larger than the electrostatic capacitance value at the detection portion D2. In particular, as the proximity position of the operating body comes closer to the detection portion D1, the resistance value from the proximity position to the detection portion D1 becomes smaller, and the resistance value from the proximity position to the detection portion D2 becomes larger, so that the electrostatic capacitance value at the detection portion D1 becomes larger, and the electrostatic capacitance value at the detection portion D2 becomes smaller.

Also, for example, when the operating body is in close proximity to a position more adjacent to the detection portion D2 than to the center of the first detection electrode 110, the electrostatic capacitance value at the detection portion D2 becomes larger than the electrostatic capacitance value at the detection portion D1. In particular, as the proximity position of the operating body comes closer to the detection portion D2, the resistance value from the proximity position to the detection portion D2 becomes smaller, and the resistance value from the proximity position to the detection portion D1 becomes larger, so that the electrostatic capacitance value at the detection portion D2 becomes larger, and the electrostatic capacitance value at the detection portion D1 becomes smaller.

Accordingly, with respect to each of the first detection electrodes 110a and 110b, the detection circuit 130 can locate the proximity position of the operating body, based on the electrostatic capacitance value at the detection portion D1 and the electrostatic capacitance value at the detection portion D2.

Similarly, the detection circuit 130 drives each of the second detection electrodes 120a to 120h by supplying an alternating-current voltage thereto. With respect to each of the second detection electrodes 120a to 120h, the detection circuit 130 can detect the electrostatic capacitance value at the detection portion D3 at the upper end portion and the electrostatic capacitance value at the detection portion D4 at the lower end portion. In addition, with respect to each of the second detection electrodes 120a to 120h, the detection circuit 130 can locate the proximity position of the operating body, based on the electrostatic capacitance value at the detection portion D3 and the electrostatic capacitance value at the detection portion D4.

<Configuration of First Detection Surfaces 112>

Figure 3:
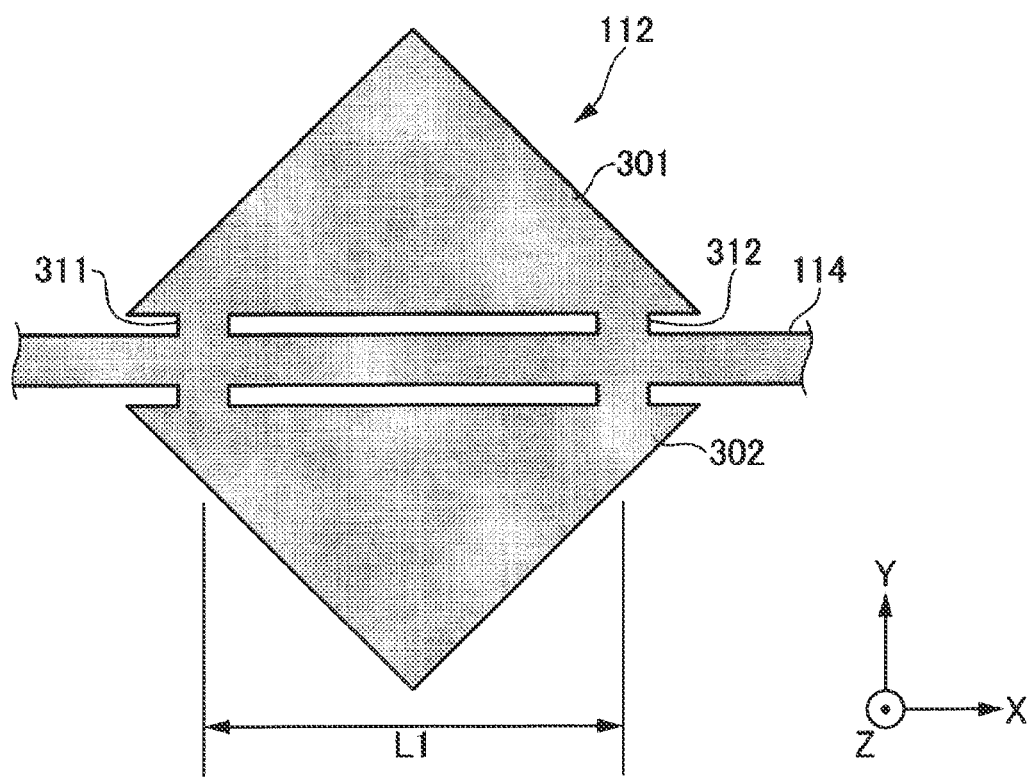
FIG. 3 is a view illustrating the configuration of each of first detection surfaces included in a first detection electrode according to one embodiment.

FIG. 3 is a view illustrating the configuration of each of the first detection surfaces 112 included in the first detection electrode 110 according to one embodiment. As illustrated in FIG. 3, each first detection surface 112 includes a plurality of second current path portions 301 and 302 and a pair of first connection portions 311 and 312.

The second current path portions 301 and 302 are arranged opposite to each other in the vertical direction (the Y-axis direction), with the first current path portion 114 being interposed therebetween. The second current path portions 301 and 302 have a shape that is line-symmetric with respect to the first current path portion 114.

Specifically, the second current path portion 301 is arranged at a front side (a positive side of the Y-axis) of the first current path portion 114 and is slightly spaced away from the first current path portion 114. The second current path portion 301 has an isosceles triangular shape whose base is parallel to the first current path portion 114.

On the other hand, the second current path portion 302 is arranged at a back side (a negative side of the Y-axis) of the first current path portion 114 and is slightly spaced away from the first current path portion 114. The second current path portion 302 has an isosceles triangular shape whose base is parallel to the first current path portion 114.

The pair of first connection portions 311 and 312 connect the second current path portions 301 and 302. Specifically, the pair of first connection portions 311 and 312 are arranged in the lateral direction (the X-axis direction) between the base portion of the second current path portion 301 and the base portion of the second current path portion 302. The pair of first connection portions 311 and 312 extend linearly in the vertical direction (the Y-axis direction) and are parallel to each other.

An upper end portion of each of the first connection portions 311 and 312 is connected to the base portion of the second current path portion 301, and a lower end portion of the first connection portions 311 and 312 is connected to the base portion of the second current path portion 302. Each of the first connection portions 311 and 312 is orthogonal to the first current path portion 114. Also, each of the first connection portions 311 and 312 is integrally formed with the first current path portion 114 and the second current path portions 301 and 302.

Since the first detection surface 112 has the pair of first connection portions 311 and 312, it has a first current path that passes through the first current path portion 114 and a second current path that passes through the second current path portions 301 and 302 between the pair of first connection portions 311 and 312. In this example, although each first detection surface 112 has the second current path portions 301 and 302, the first detection surface 112 does not necessarily have to have a plurality thereof and may have a configuration having only one second current path portion 301 (or 302). In other words, each of the first detection surfaces 112 has one or more second current path portions 301 and 302 and the pair of first connection portions 311 and 312 via which the one or more second current path portions 301 and 302 and the first current path portion 114 are connected in parallel to each other.

As illustrated in FIG. 3, in each of the first detection surfaces 112 included in the first detection electrode 110, the pair of first connection portions 311 and 312 have a spacing L1 therebetween in the lateral direction (the X-axis direction). In the first detection surface 112, adjusting the spacing L1 makes it possible to adjust a resistance value of the whole first detection surface 112 (that is, a resistance value between two opposite ends of the first current path portion 114 that passes through the first detection surface 112). Specifically, as will be described below with reference to FIG. 5, the resistance value of the whole first detection surface 112 decreases, as the spacing L1 increases. Thus, in the first detection surface 112 in the present embodiment, adjusting the spacing L1 between the pair of first connection portions 311 and 312 makes it possible to set the resistance value of the whole first detection surface 112 to a desired resistance value without changing the area of the second current path portions 301 and 302. In the surface-type detection system, each of the first detection electrodes 110a and 110b needs to have a certain degree of resistance value, as described above. Accordingly, in each of the first detection electrodes 110a and 110b, the spacing L1 between the pair of first connection portions 311 and 312 may be adjusted so that each of the first detection surfaces 112 has a first predetermined resistance value as a whole. In this case, the first predetermined resistance value is a resistance value that enables electrostatic capacitance detection based on the surface-type detection system and is determined by a designer adjusting the spacing L1.

<Configuration of Second Detection Surfaces 122>

Figure 4:
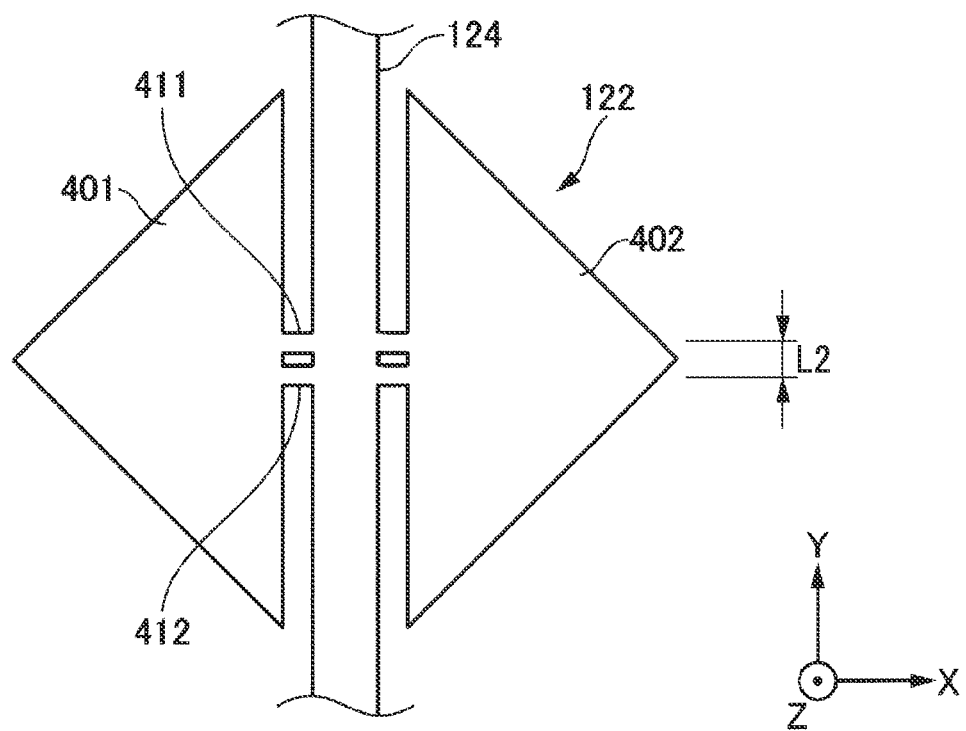
FIG. 4 is a view illustrating the configuration of each of second detection surfaces included in a second detection electrode according to one embodiment.

FIG. 4 is a view illustrating the configuration of each of the second detection surfaces 122 included in the second detection electrode 120 according to one embodiment. As illustrated in FIG. 4, each second detection surface 122 includes a plurality of fourth current path portions 401 and 402 and a pair of second connection portions 411 and 412.

The fourth current path portions 401 and 402 are arranged opposite to each other in the lateral direction (the X-axis direction), with the third current path portion 124 being interposed therebetween. The fourth current path portions 401 and 402 have a shape that is line-symmetric with respect to the third current path portion 124.

Specifically, the fourth current path portion 401 is arranged at the left side (a negative side of the X-axis) of the third current path portion 124 and is slightly spaced away from the third current path portion 124. The fourth current path portion 401 has an isosceles triangular shape whose base is parallel to the third current path portion 124.

On the other hand, the fourth current path portion 402 is arranged at a right side (the positive side of the X-axis) of the third current path portion 124 and is slightly spaced away from the third current path portion 124. The fourth current path portion 402 has an isosceles triangular shape whose base is parallel to the third current path portion 124.

The pair of second connection portions 411 and 412 connect the fourth current path portion 401 and the fourth current path portion 402. Specifically, the pair of second connection portions 411 and 412 are arranged in the vertical direction (the Y-axis direction) between the base portion of the fourth current path portion 401 and the base portion of the fourth current path portion 402. The second connection portions 411 and 412 extend linearly in the lateral direction (the X-axis direction) and are parallel to each other.

A left-end portion of each of the second connection portions 411 and 412 is connected to the base portion of the fourth current path portion 401, and a right-end portion of each of the second connection portions 411 and 412 is connected to the base portion of the fourth current path portion 402. Each of the second connection portions 411 and 412 is orthogonal to the third current path portion 124. Also, each of the second connection portions 411 and 412 is integrally formed with the third current path portion 124 and the fourth current path portions 401 and 402.

Since the second detection surface 122 has the pair of second connection portions 411 and 412, the second detection surface 122 has a third current path that passes through the third current path portion 124 and a fourth current path that passes through the fourth current path portions 401 and 402 between the pair of second connection portions 411 and 412. In this example, although the second detection surface 122 has the fourth current path portions 401 and 402, it does not necessarily have to have a plurality thereof and may have only one fourth current path portion 401 (or 402). In other words, each of the second detection surfaces 122 has one or more fourth current path portions 401 and 402 and the pair of second connection portions 411 and 412 via which one or more fourth current path portions 401 and 402 and the third current path portion 124 are connected in parallel to each other.

In this case, in the second detection surface 122 included in the second detection electrode 120, the pair of second connection portions 411 and 412 have a spacing L2 therebetween in the vertical direction (the Y-axis direction). Adjusting the spacing L2 in the second detection surface 122 makes it possible to adjust a resistance value of the whole second detection surface 122 (that is, a resistance value between two opposite ends of the third current path portion 124 that passes through the second detection surface 122). Specifically, the resistance value of the whole second detection surface 122 decreases, as the spacing L2 in the second detection surface 122 increases, as in the first detection surface 112. Thus, in the second detection surface 122 in the present embodiment, adjusting the spacing L2 between the pair of second connection portions 411 and 412 makes it possible to set the resistance value of the whole second detection surface 122 to a desired resistance value.

In the surface-type detection system, each of the second detection electrodes 120a to 120h needs to have a certain degree of resistance value, as described above. Accordingly, in each of the second detection electrodes 120a to 120h, the spacing L2 between the pair of second connection portions 411 and 412 may be adjusted so that each of the second detection surfaces 122 has a second predetermined resistance value as a whole. In this case, the second predetermined resistance value is a resistance value that enables electrostatic capacitance detection based on the surface-type detection system and is determined by a designer adjusting the spacing L2.

As illustrated in FIGS. 1 and 3, in each first detection surface 112 included in each first detection electrode 110, the spacing L1 between the pair of first connection portions 311 and 312 is relatively large. In each first detection surface 112 included in each first detection electrode 110, the resistance value of the whole first detection surface 112 is a relatively small first predetermined resistance value pre-defined based on the aspect ratio of the operation surface 102.

As illustrated in FIG. 1, the operation surface 102 has a laterally long rectangular shape. Correspondingly, the length of each first detection electrode 110 in the lateral direction (the X-axis direction) is relatively large according to the length of the operation surface 102 in the lateral direction, and the number of first detection surfaces 112 in each first detection electrode 110 is also relatively large (nine in the example illustrated in FIG. 1). Thus, in each first detection electrode 110, even when the resistance value of each first detection surface 112 is relatively small, the first detection electrode 110 has a relatively large resistance value as a whole. This makes it easier to detect changes in the electrostatic capacitance value at each first detection electrode 110.

In contrast, in each second detection surface 122 included in each second detection electrode 120, the spacing L2 between the pair of second connection portions 411 and 412 is relatively small, as illustrated in FIGS. 1 and 4. Thus, in each of the second detection surfaces 122 included in each second detection electrode 120, the resistance value of the whole second detection surface 122 is a relatively large second predetermined resistance value pre-defined based on the aspect ratio of the operation surface 102.

As illustrated in FIG. 1, the length of each second detection electrode 120 in the vertical direction (the Y-axis direction) is relatively small according to the length of the operation surface 102 in the vertical direction, and the number of second detection surfaces 122 in each second detection electrode 120 is also relatively small (three, in the example illustrated in FIG. 1). Thus, each second detection electrode 120 is adapted so that the second detection electrode 120 obtains a relatively large resistance value as a whole by minimizing the spacing L2 between the pair of second connection portions 411 and 412 and maximizing the resistance value of each second detection surface 122. This makes it easier for each second detection electrode 120 to detect changes in the electrostatic capacitance value.

<Spacing L1 Versus Resistance Value>

Figure 5:
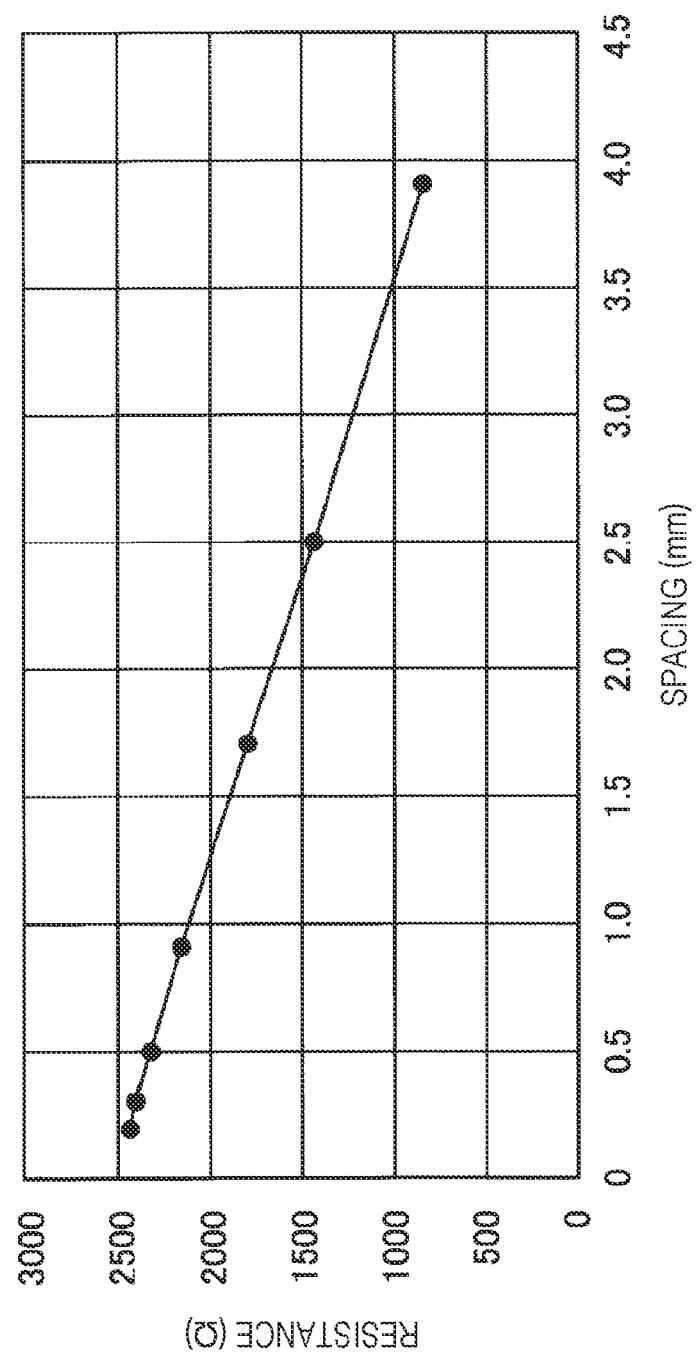
FIG. 5 is a graph illustrating a spacing between a pair of connection portions in a first detection surface included in a first detection electrode according to one embodiment versus a resistance value.

FIG. 5 is a graph illustrating the spacing L1 between the pair of first connection portions 311 and 312 in each of the first detection surfaces 112 included in the first detection electrode 110 according to one embodiment versus a resistance value. In the graph illustrated in FIG. 5, the vertical axis represents the resistance value of the whole first detection surface 112, and the horizontal axis represents the spacing L1 between the pair of first connection portions 311 and 312 in the first detection surface 112.

As illustrated in FIG. 5, the resistance value of the whole first detection surface 112 in the present embodiment decreases, as the spacing L1 between the pair of first connection portions 311 and 312 in the first detection surface 112 increases. This is thought to be because current paths in the second current path portions 301 and 302 connected in parallel to the first current path portion 114 between the pair of first connection portions 311 and 312 increases, that is, a combined resistance value of the first current path portion 114 and the second current path portions 301 and 302 between the pair of first connection portions 311 and 312 decreases.

Thus, adjusting the spacing L1 between the pair of first connection portions 311 and 312 in the first detection surface 112 in the present embodiment makes it possible to set the resistance value of the whole first detection surface 112 to a desired resistance value without changing the area of the first detection surface 112.

Since the second detection surface 122 included in the second detection electrode 120 has a configuration similar to that of each of the first detection surfaces 112 included in the first detection electrode 110, the resistance value of the whole second detection surface 122 decreases as the spacing L2 between the pair of second connection portions 411 and 412 increases, as in the first detection surface 112. Thus, adjusting the spacing L2 between the pair of second connection portions 411 and 412 in the second detection surface 122 in the present embodiment makes it possible to set the resistance value of the whole second detection surface 122 to a desired resistance value without changing the area of the second detection surface 122.

<First Modification of First Detection Surfaces 112>

Figure 6:
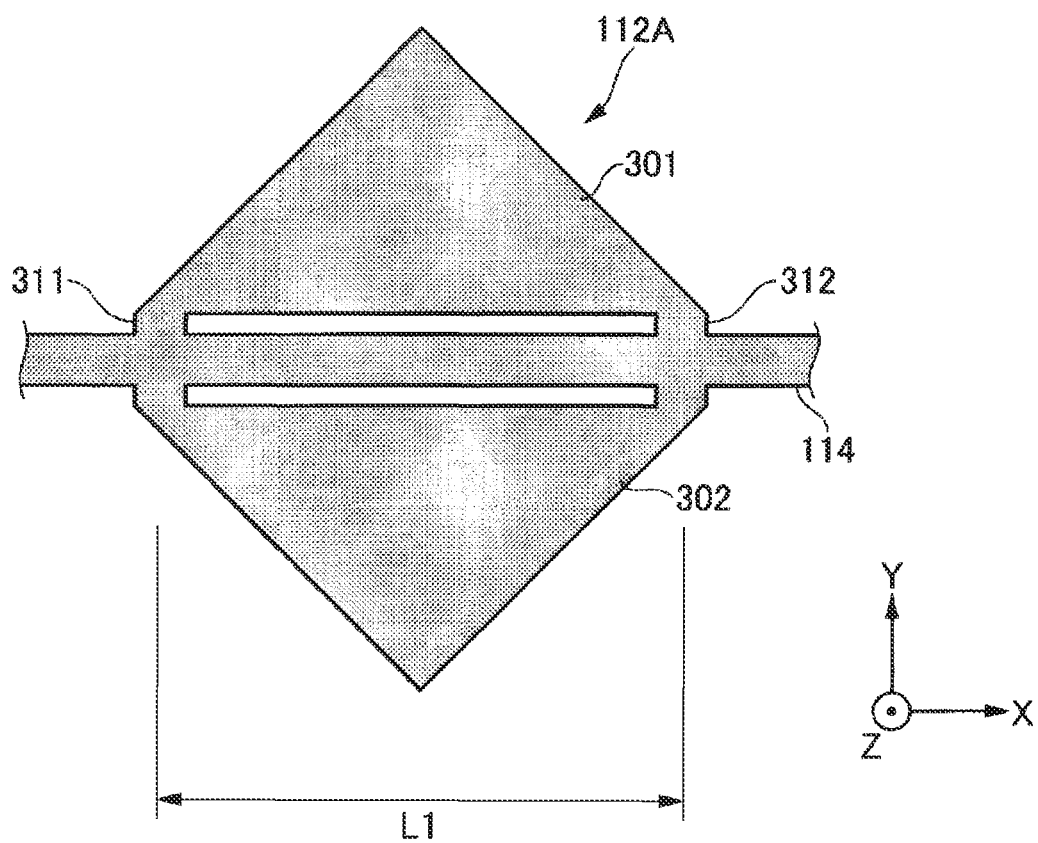
FIG. 6 is a view illustrating a first modification of each of the first detection surfaces included in the first detection electrode according to one embodiment.

FIG. 6 is a view illustrating a first modification of each of the first detection surfaces 112 included in the first detection electrode 110 according to one embodiment. In a first detection surface 112A illustrated in FIG. 6, the positions of the pair of first connection portions 311 and 312 in the lateral direction are changed from the positions in the first detection surface 112 illustrated in FIG. 3.

Specifically, in the first detection surface 112A illustrated in FIG. 6, the position of the first connection portion 311 is changed to a position where a left-end portion of the second current path portion 301 and a left-end portion of the second current path portion 302 are connected to each other. Also, the position of the first connection portion 312 is changed to a position where a right-end portion of the second current path portion 301 and a right-end portion of the second current path portion 302 are connected to each other.

With this arrangement, the spacing L1 between the pair of first connection portions 311 and 312 is maximized in the first detection surface 112A. That is, in the first detection surface 112A, the resistance value of the whole first detection surface 112 (that is, the resistance value between two opposite ends of the first current path portion 114 that passes through the first detection surface 112) is minimized.

<Second Modification of First Detection Surface 112>

Figure 7:
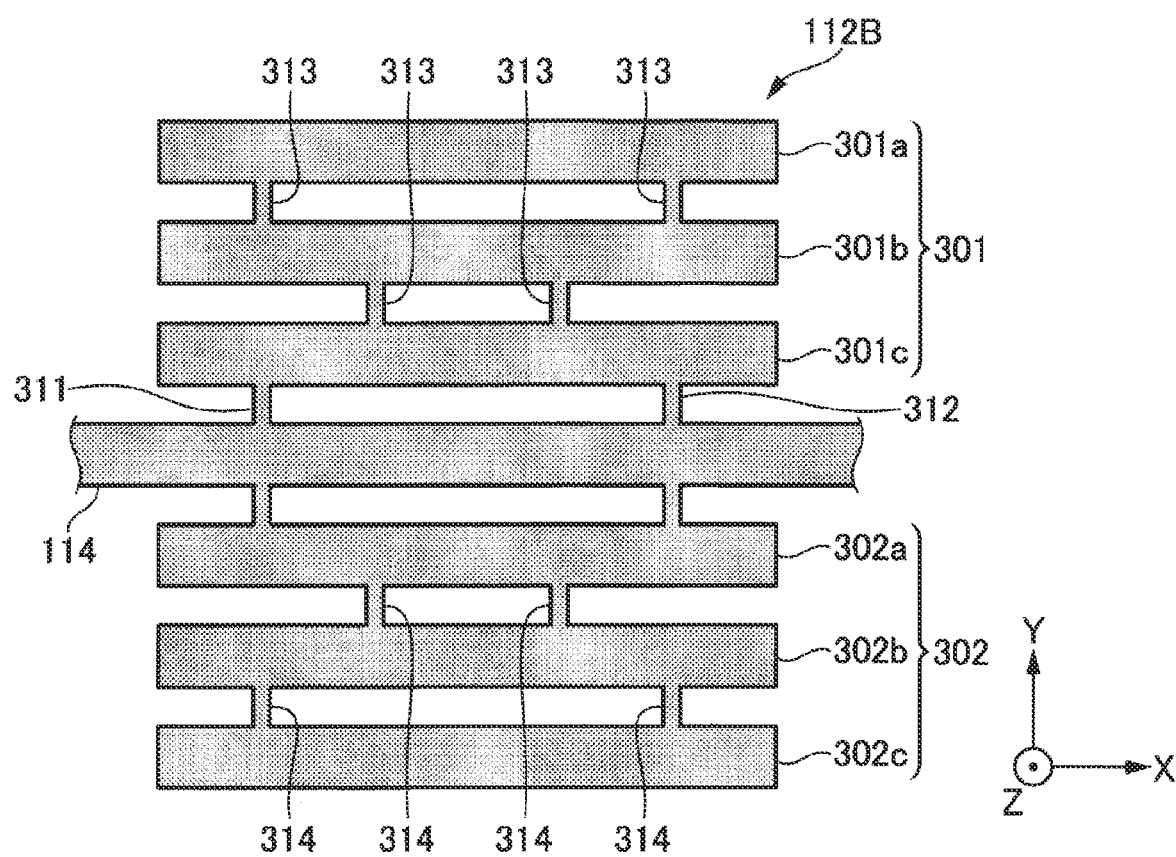
FIG. 7 is a view illustrating a second modification of each of the first detection surfaces included in the first detection electrode according to one embodiment.

FIG. 7 is a view illustrating a second modification of each of the first detection surfaces 112 included in the first detection electrode 110 according to one embodiment. A first detection surface 112B illustrated in FIG. 7 has an electrode shape that is different from those of the first detection surface 112 (see FIG. 3) and the first detection surface 112A (see FIG. 6).

Specifically, the second current path portion 301 included in the first detection surface 112B has three current path portions 301a, 301b, and 301c that extend parallel to each other in the lateral direction (the X-axis direction). Also, in the second current path portion 301, two current path portions that are adjacent to each other are connected by a pair of connection portions 313 that extend parallel to each other in the vertical direction (the Y-axis direction). Thus, the second current path portion 301 has three current paths constituted by the three current path portions 301a, 301b, and 301c.

Also, the second current path portion 302 included in the first detection surface 112B has three current path portions 302a, 302b, and 302c that extend parallel to each other in the lateral direction (the X-axis direction). Also, in the second current path portion 302, two current path portions that are adjacent to each other are connected by a pair of connection portions 314 that extend parallel to each other in the vertical direction (the Y-axis direction). Thus, the second current path portion 302 has three current paths constituted by the three current path portions 302a, 302b, and 302c.

Also, the second current path portions 301 and 302 are connected to each other via the pair of first connection portions 311 and 312 that extend parallel to each other in the vertical direction (the Y-axis direction), and the second current path portions 301 and 302 are also connected to the first current path portion 114.

As illustrated in FIG. 7, each first detection surface 112 included in each first detection electrode 110 may have any shape, that is, may have neither a rhombus shape nor a polygonal shape.

Also, in the first detection surface 112, since each of the second current path portions 301 and 302 has a plurality of current paths, each of the second current path portions 301 and 302 allows the resistance value to be adjusted, thus making it possible to more finely adjust the resistance value of the whole first detection surface 112.

As described above, an input device 100 according to one embodiment includes: an operation surface 102 that receives an operation from an operating body; and first detection electrodes 110a and 110b that are arranged along the operation surface 102 and that extend parallel to each other in the lateral direction. Each of the first detection electrodes 110a and 110b has first detection surfaces 112 that are provided side by side in the lateral direction and a first current path portion 114 that extends linearly in the lateral direction and via which first detection surfaces 112 are connected to each other; and each of the first detection surfaces 112 has second current path portions 301 and 302 and a pair of first connection portions 311 and 312 via which the second current path portions 301 and 302 and the first current path portion 114 are connected in parallel to each other.

With this arrangement, the input device 100 according to one embodiment makes it possible to easily adjust the resistance value of the first detection surface 112 without changing the area of the first detection surface 112. In the input device 100 according to one embodiment, adjusting the resistance value of each first detection surface 112 in each first detection electrode 110 makes it possible to easily increase the resistance value of each first detection electrode 110. Thus, for performing electrostatic capacitance detection using the principle of the surface-type detection system, even when the current path in each first detection electrode 110 is relatively small, the input device 100 according to one embodiment can realize high-accuracy proximity sensing by increasing the resistance value of each first detection electrode 110. Also, in the input device 100 according to one embodiment, even when a low-resistance, low-cost electrode film is used for each first detection electrode 110, the resistance value of each first detection electrode 110 can be easily increased, thus making it possible to reduce cost related to each first detection electrode 110. That is, in an electrostatic capacitance detection using the principle of the surface-type detection system, a material having a certain degree of resistance value needs to be used for the detection electrodes, as described above. Since the present invention makes it possible to adjust the resistance value, it is possible to perform operating-body proximity sensing based on electrostatic capacitance detection by using a low-cost material without using a high cost material with a relatively high resistance value, regardless of whether the resistance value is high or low. Examples of the material include indium tin oxide (ITO). Also, in the input device 100 according to one embodiment, since it is possible to adjust the resistance value of the first detection surface 112 without changing the area of the second current path portions 301 and 302 in the first detection surface 112, it is possible to adjust the resistance value of the first detection surface 112 without affecting the detection sensitivity of the first detection surface 112.

In addition, in the input device 100 according to one embodiment, in each of the first detection electrodes 110a and 110b, the spacing L1 between the pair of first connection portions 311 and 312 is adjusted so that each of the first detection surfaces 112 has the first predetermined resistance value as a whole.

With this arrangement, in the input device 100 according to one embodiment, adjusting the spacing L1 between the pair of first connection portions 311 and 312 makes it possible to easily adjust the resistance value of the first detection surface 112.

Also, in the input device 100 according to one embodiment, each of the first detection surfaces 112 has a rhombus shape.

With this arrangement, in the input device 100 according to one embodiment, the first detection surfaces 112 can cover a wide range of the operation surface 102.

In addition, the input device 100 according to one embodiment further includes: second detection electrodes 120a to 120h that are arranged along the operation surface 102 and that extend parallel to each other in a vertical direction. Each of the second detection electrodes 120a to 120h has second detection surfaces 122 that are provided side by side in the vertical direction and a third current path portion 124 that extends linearly in the vertical directions and via which the second detection surfaces 122 are connected to each other; and each of the second detection surfaces 122 has fourth current path portions 401 and 402 and a pair of second connection portions 411 and 412 via which the fourth current path portions 401 and 402 and the third current path portion 124 are connected in parallel to each other.

With this arrangement, since the resistance values of the respective first detection electrodes 110 that extend in the lateral directions and the resistance values of the respective second detection electrodes 120 that extend in the vertical directions can be individually and easily adjusted, the input device 100 according to one embodiment can be applied to input devices in which the operation surface 102 has various aspect ratios.

Also, in the input device 100 according to one embodiment, in each of the second detection electrodes 120a to 120h, the spacing L2 between the pair of second connection portions 411 and 412 may be adjusted so that each of the second detection surfaces 122 has the second predetermined resistance value as a whole.

Thus, in the input device 100 according to one embodiment, adjusting the spacing L2 between the pair of second connection portions 411 and 412 makes it possible to easily adjust the resistance value of the second detection surface 122 without changing the area of the second detection surface 122.

Also, in the input device 100 according to one embodiment, each of the second detection surfaces 122 has a rhombus shape.

With this arrangement, in the input device 100 according to one embodiment, the second detection surfaces 122 can cover a wide range of the operation surface 102.

In addition, in the input device 100 according to one embodiment, the spacing L1 between the pair of first connection portions 311 and 312 and the spacing L2 between the pair of second connection portions 411 and 412 may be adjusted based on the aspect ratio of the operation surface 102. That is, the first predetermined resistance value and the second predetermined resistance value are values pre-defined based on the aspect ratio of the operation surface 102.

Thus, in the input device 100 according to one embodiment, appropriately adjusting the first predetermined resistance value and the second predetermined resistance value in accordance with the aspect ratio of the operation surface 102 makes it possible to perform appropriate proximity sensing in each of the vertical direction and the lateral direction of the operation surface 102.

Although the embodiments of the present invention have been described above in detail, the present invention is not limited to those embodiments, and various changes and modifications can be made thereto within the spirit of the present invention recited in the claims.

For example, in the input device 100 according to one embodiment, the operation surface 102 does not necessarily have to have a laterally long rectangular shape in plan view from above, and the present invention can be applied to various shapes. In addition, in the input device 100 according to one embodiment, each of the first detection surfaces 112 may have a polygonal shape other than the rhombus shape. With this arrangement, in the input device 100 according to one embodiment, the first detection surfaces 112 can cover a wide range of the operation surface 102.

In addition, for example, in the input device 100 according to one embodiment, each of the first detection surfaces 112 may have one second current path portion or three or more second current path portions.

Also, in the input device 100 according to one embodiment, each of the second detection surfaces 122 may have a polygonal shape other than the rhombus shape. With this arrangement, in the input device 100 according to one embodiment, the second detection surfaces 122 can cover a wide range of the operation surface 102.

In addition, for example, in the input device 100 according to one embodiment, each of the second detection surfaces 122 may have one fourth current path portion or three or more fourth current path portions.

What is claimed is:
1. An input device comprising:
an operation surface configured to receive an operation by an operating body in proximity thereto; and a plurality of first detection electrodes arranged along the operation surface and extending in parallel in a first direction, each of the plurality of first detection electrodes including:
- a plurality of first detection surfaces arranged side by side in the first direction; and
- a first current path portion linearly extending in the first direction, thereby electrically connecting the plurality of first detection surfaces to each other, wherein each of the plurality of first detection surfaces includes:
- at least one second current path portion; and
- a pair of first connection portions, via which the at least one second current path portion and the first current path portion are connected in parallel to each other.

2. The input device according to claim 1, wherein, in each of the plurality of first detection electrodes, a spacing between the pair of first connection portions is adjusted so that each of the plurality of first detection surfaces has a first predetermined resistance value as a whole.

3. The input device according to claim 1, wherein each of the plurality of first detection surfaces has a polygonal shape.

4. The input device according to claim 3, wherein each of the plurality of first detection surfaces has a rhombus shape.

5. The input device according to claim 1, further comprising:
a plurality of second detection electrodes arranged along the operation surface and extending in parallel in a second direction different from the first direction, each of the plurality of second detection electrodes including:
- a plurality of second detection surfaces arranged side by side in the second direction; and
- a third current path portion linearly extending in the second direction, thereby electrically connecting the plurality of second detection surfaces to each other, wherein each of the plurality of second detection surfaces includes:
- at least one fourth current path portion; and
- a pair of second connection portions, via which the at least one fourth current path portion and the third current path portion are connected in parallel to each other.

6. The input device according to claim 5, wherein in each of the plurality of second detection electrodes, a spacing between the pair of second connection portions is adjusted so that each of the plurality of second detection surfaces has a second predetermined resistance value as a whole.

7. The input device according to claim 5, wherein each of the plurality of second detection surfaces has a polygonal shape.

8. The input device according to claim 7, wherein each of the plurality of second detection surfaces has a rhombus shape.

9. The input device according to claim 5, wherein a spacing between the pair of first connection portions and a spacing between the pair of second connection portions are adjusted based on an aspect ratio of the operation surface.

10. The input device according to claim 1, wherein the pair of first connection portions are arranged side by side along the first direction.

11. The input device according to claim 5, wherein the pair of second connection portions are arranged side by side along the second direction.

* * * * *